Figure 3:
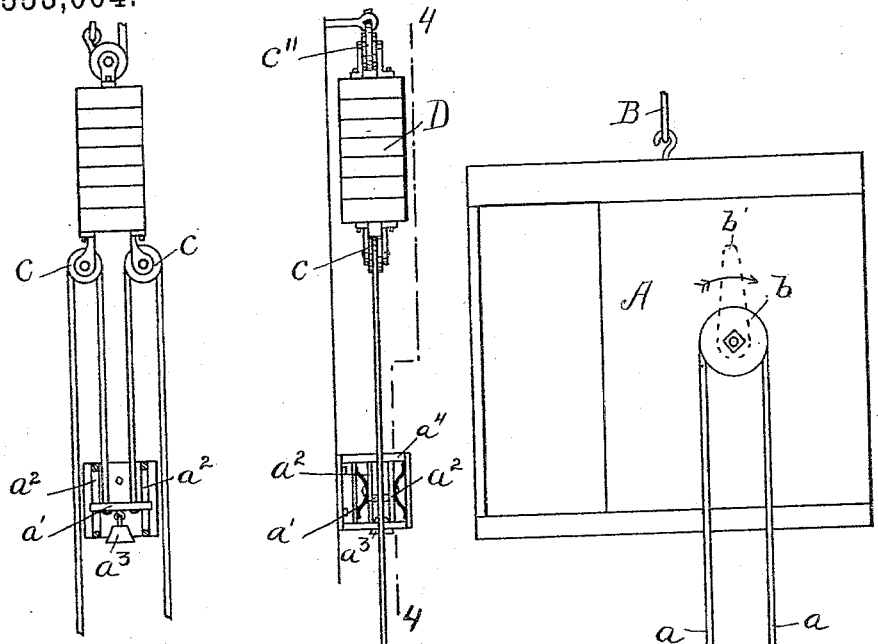

(No Model.) 9 Sheets—Sheet 1.

C. A. HARKNESS.
ELEVATOR.

No. 553,064. Patented Jan. 14, 1896.

WITNESSES.
Matthew M. Blunt.
C. C. Steeher.

INVENTOR.
Chas. A. Harkness.
By Crossley ATT'Y.

(No Model.) 9 Sheets—Sheet 2.
C. A. HARKNESS.
ELEVATOR.
No. 553,064. Patented Jan. 14, 1896.
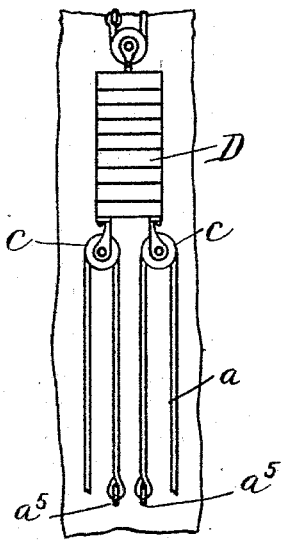
Fig. 5.
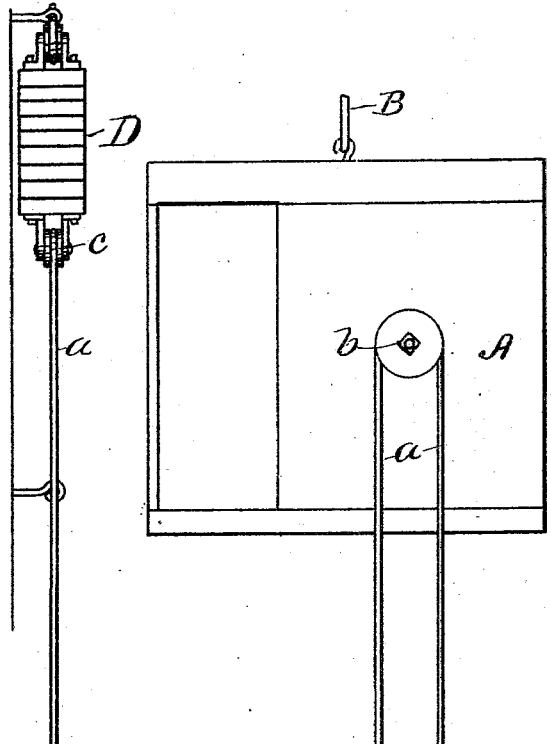
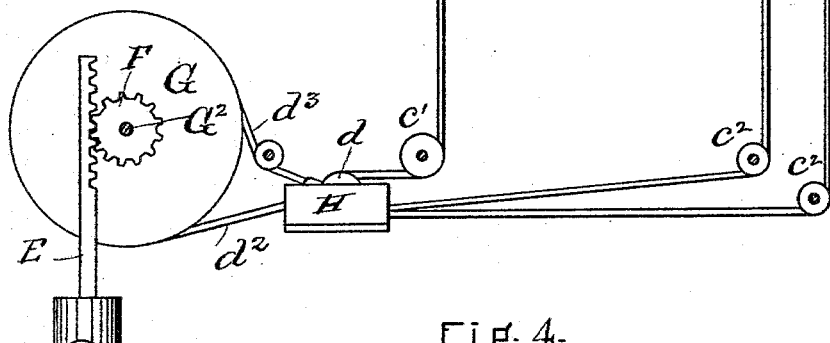
Fig. 4.
WITNESSES.
Matthew M. Blunt.
C. C. Stecher.
INVENTOR.
Chas. A. Harkness
By
Arthur C. Crossley,
ATT'Y.

(No Model.)  
9 Sheets—Sheet 3.

C. A. HARKNESS.
ELEVATOR.

No. 553,064.  Patented Jan. 14, 1896.

WITNESSES.
Matthew M. Blunt.
C. C. Stecher

INVENTOR.
Charles A. Harkness,
By
Arthur C. Crossley
ATT'Y.

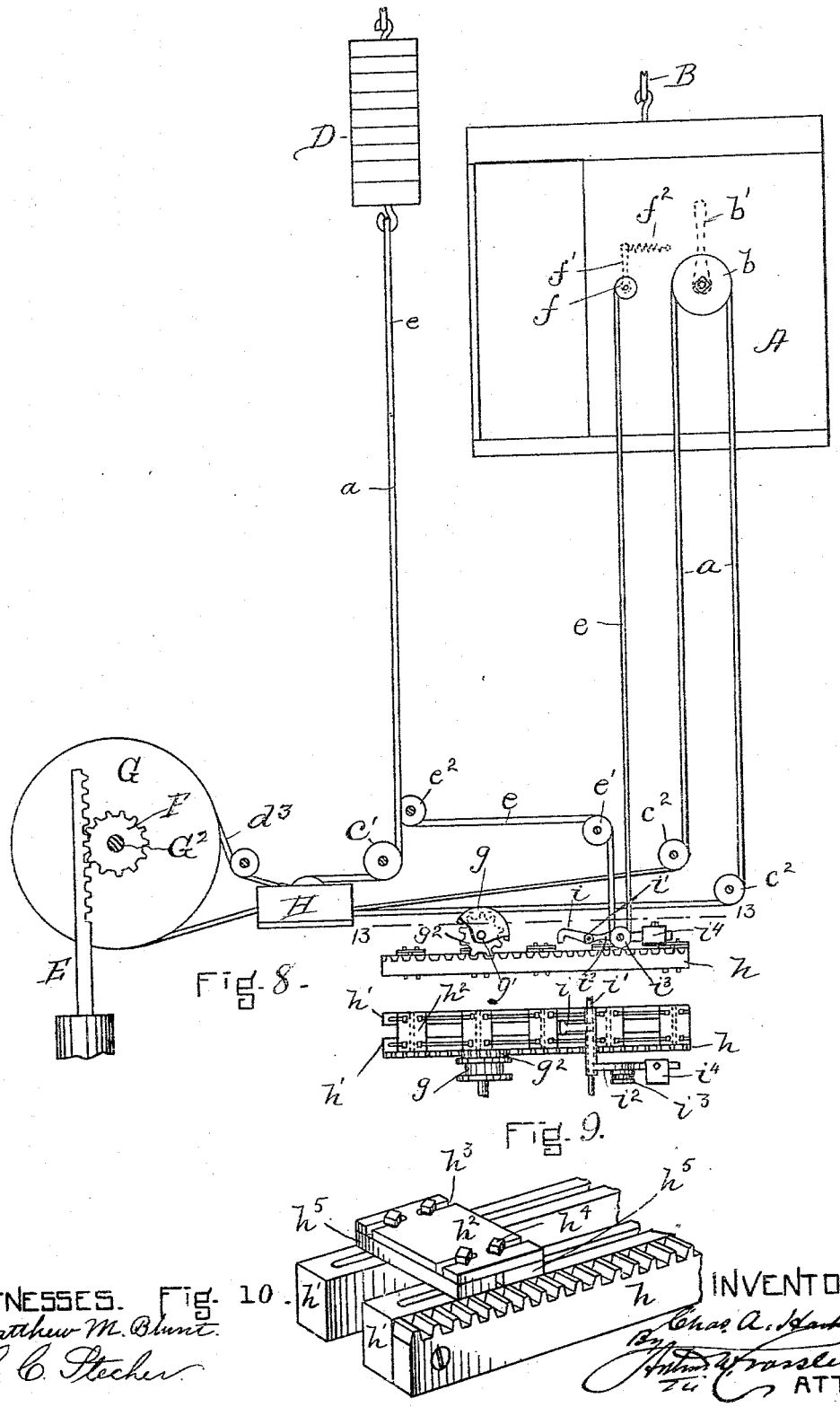

(No Model.) 9 Sheets—Sheet 6.

C. A. HARKNESS.
ELEVATOR.

No. 553,064. Patented Jan. 14, 1896.

WITNESSES.
Matthew M. Blunt.
Marcus B. May.

INVENTOR.
Charles A. Harkness
By
Arthur W. Crosley,
ATT'Y.

(No Model.) 9 Sheets—Sheet 7.

C. A. HARKNESS.
ELEVATOR.

No. 553,064. Patented Jan. 14, 1896.

WITNESSES.
Matthew M. Blunt.
C. C. Stecher.

INVENTOR.
Chas. A. Harkness.
By Arthur W. Crossley, ATT'Y.

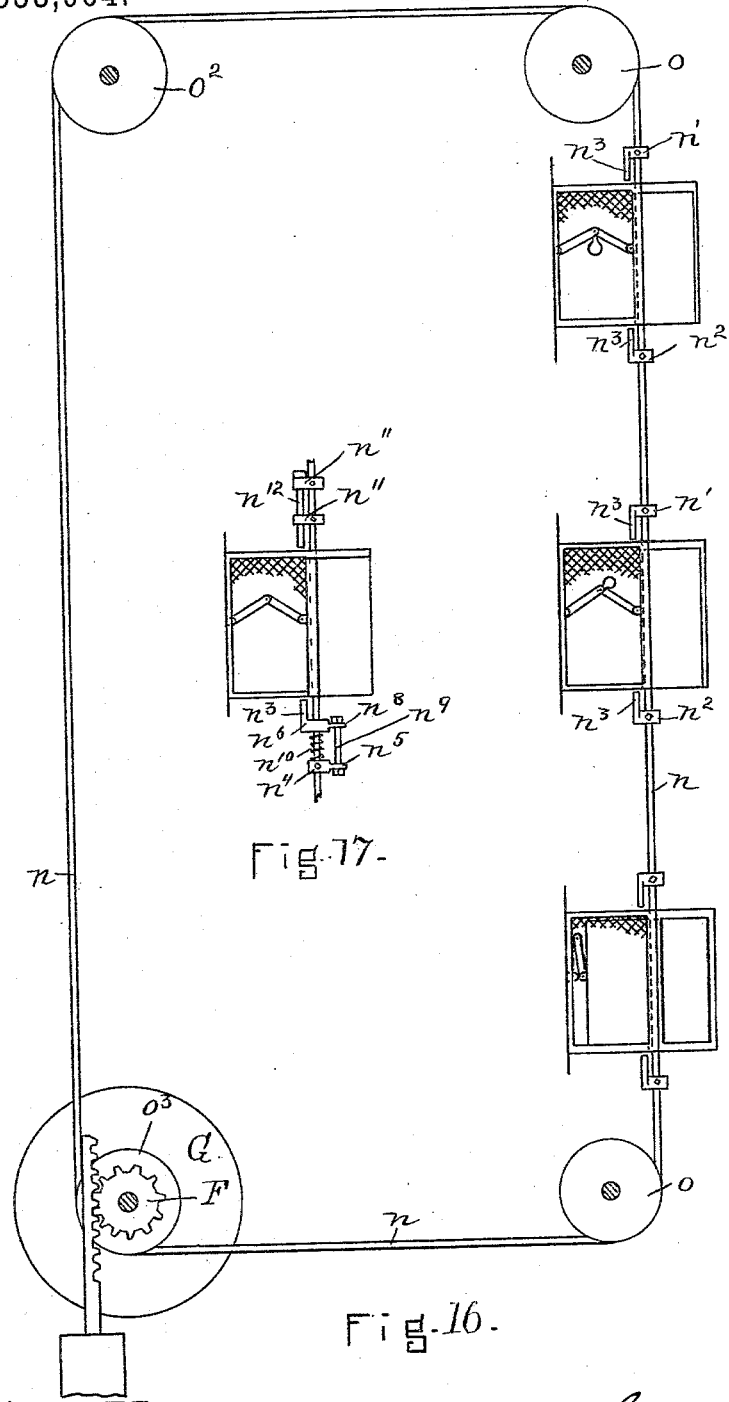

(No Model.)

C. A. HARKNESS.
ELEVATOR.

No. 553,064. Patented Jan. 14, 1896.

9 Sheets—Sheet 9.

WITNESSES.
Matthew M. Blunt.
C. C. Stecher.

INVENTOR.
Chas. A. Harkness
By Amund W. Crossley,
ATT'Y.

UNITED STATES PATENT OFFICE.

CHARLES A. HARKNESS, OF PROVIDENCE, RHODE ISLAND.

ELEVATOR.

SPECIFICATION forming part of Letters Patent No. 553,064, dated January 14, 1896.

Application filed February 8, 1895. Serial No. 537,710. (No model.)

*To all whom it may concern:*

Be it known that I, CHARLES A. HARKNESS, of Providence, in the county of Providence and State of Rhode Island, have invented certain new and useful Improvements in Elevators, of which the following is a specification.

My invention relates to certain new and useful improvements in elevators and devices for controlling the movements thereof.

Among the various objects of the invention are, first, the providing of certain connections between the cage and valve moving devices whereby the said valve-moving devices will be sensible of the slightest movement of the operating-rope; second, the provision of a manipulating or operating rope which will not be subjected to any vibrations or jerks resulting from the stopping or starting of the cage; third, the provision of means to compensate for the slightest lengthening or shortening of the operating-rope; fourth, the provision of means supplemental to the operating-rope for effecting the movements of the cage and for stopping it, either at will or automatically; fifth, the provision of means supplemental to the operating-rope for stopping the movements of the cage when it has reached the highest or lowest point in its travel; sixth, the provision of means whereby all the doors leading into the well are automatically locked against movement during the travel of the cage and can be opened only when the cage is at rest at predetermined points; seventh, the provision of means for locking the cage against movement while the door is open; eighth, the provision of means for audibly notifying persons on various floors when the cage is in motion, and, ninth, the provision of other novel features of construction and arrangement of parts for the perfection of an elevator, as will hereinafter be described and pointed out.

Reference is to be had to the annexed drawings and to the letters marked thereon, forming a part of this specification, the same letters designating the same parts or features, as the case may be, wherever they occur.

Figure 1:
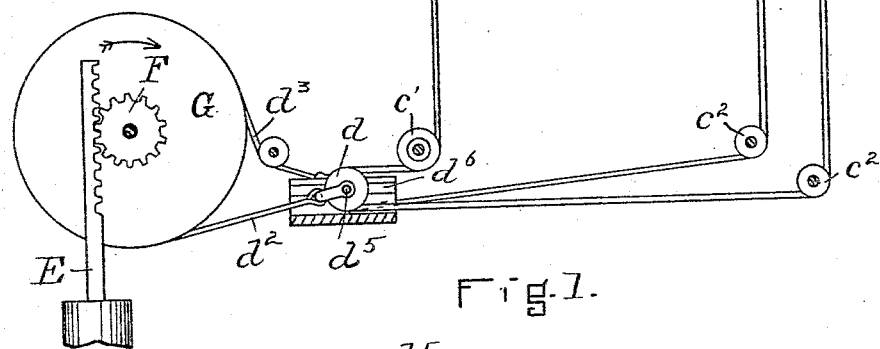
Figure 2:
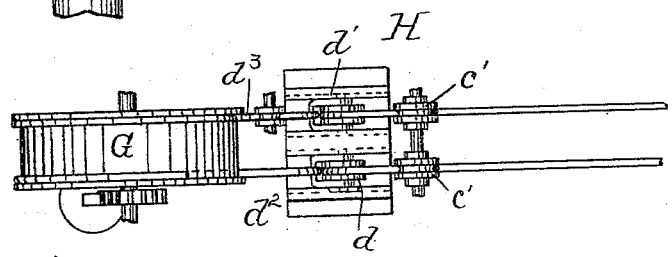
Figure 7:
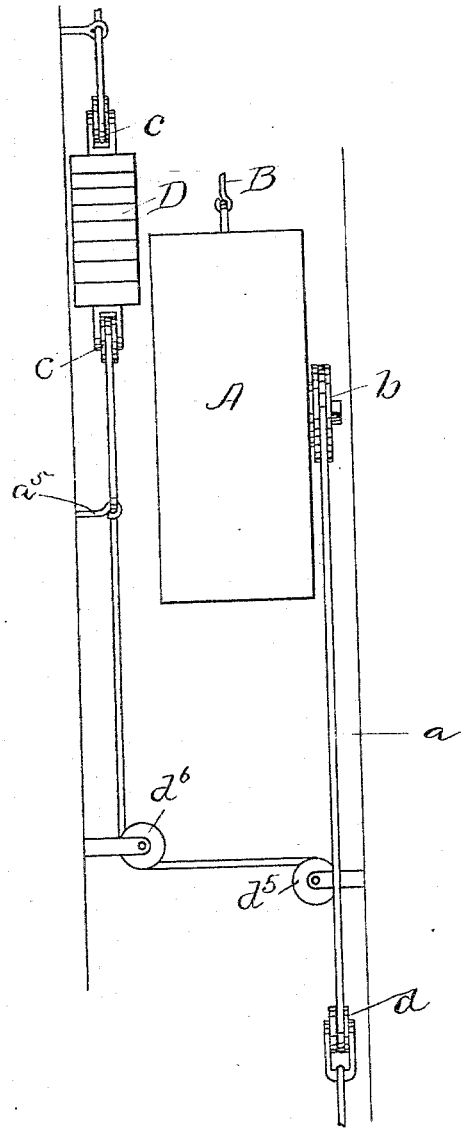
Figure 6:
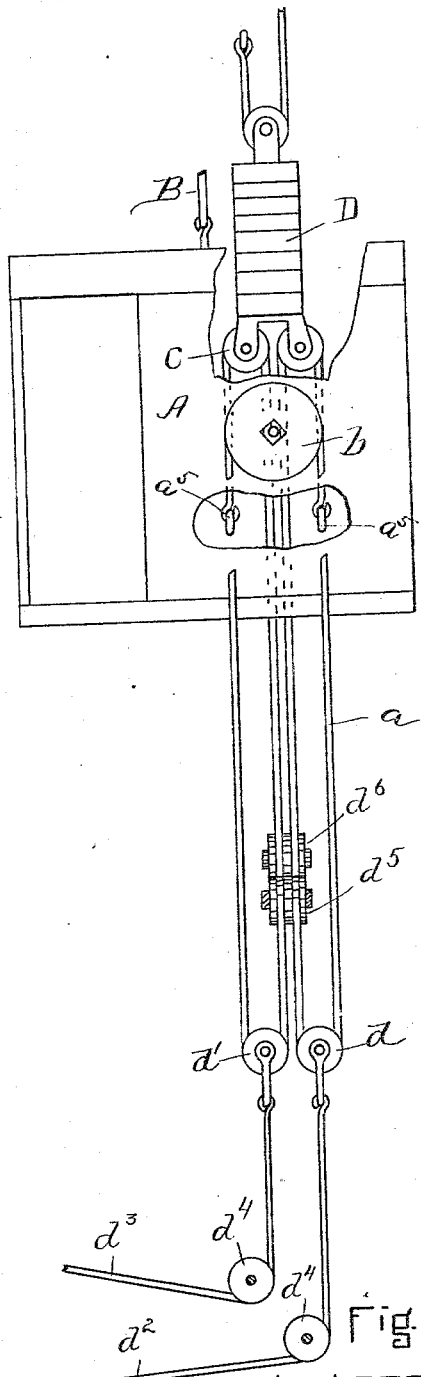
Figure 11:
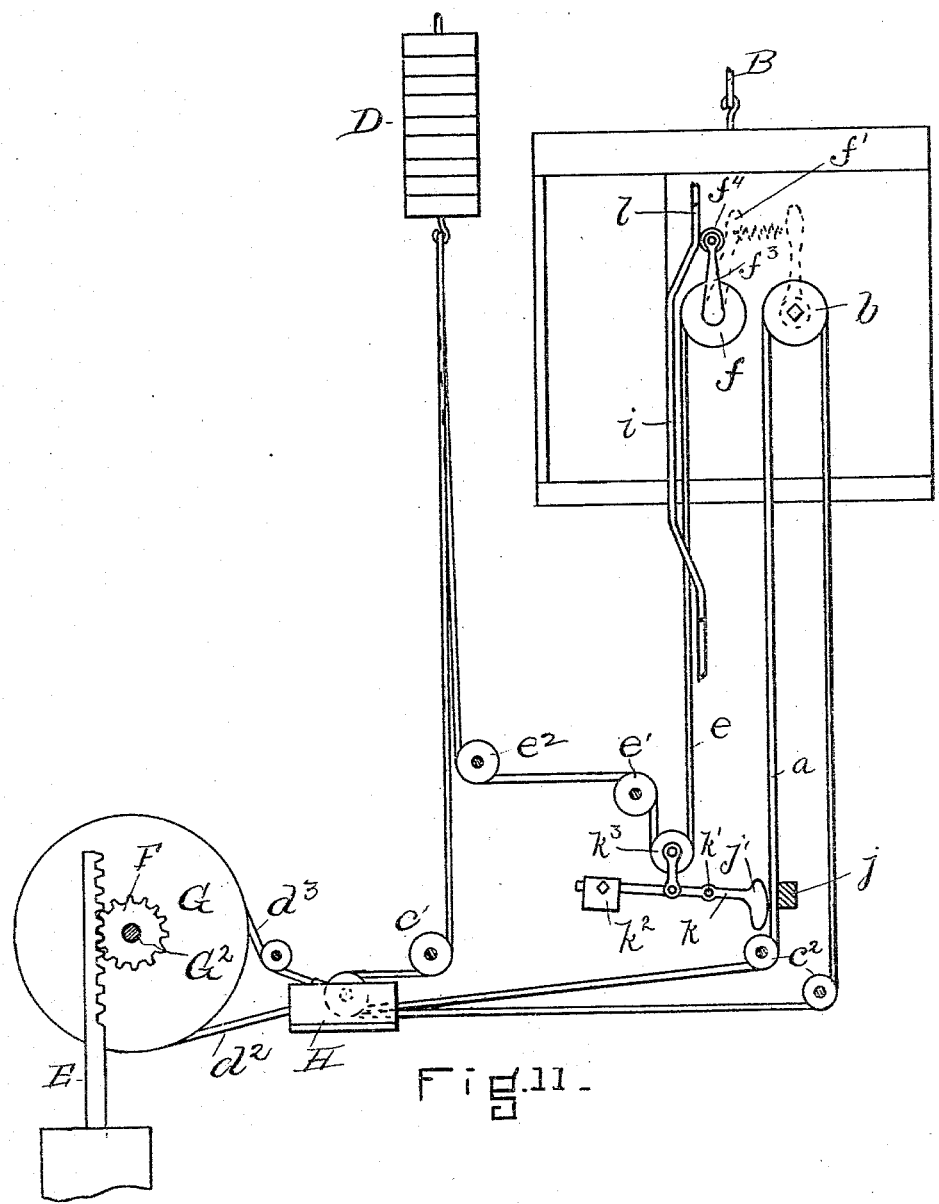
Figures 12, 13, 14:
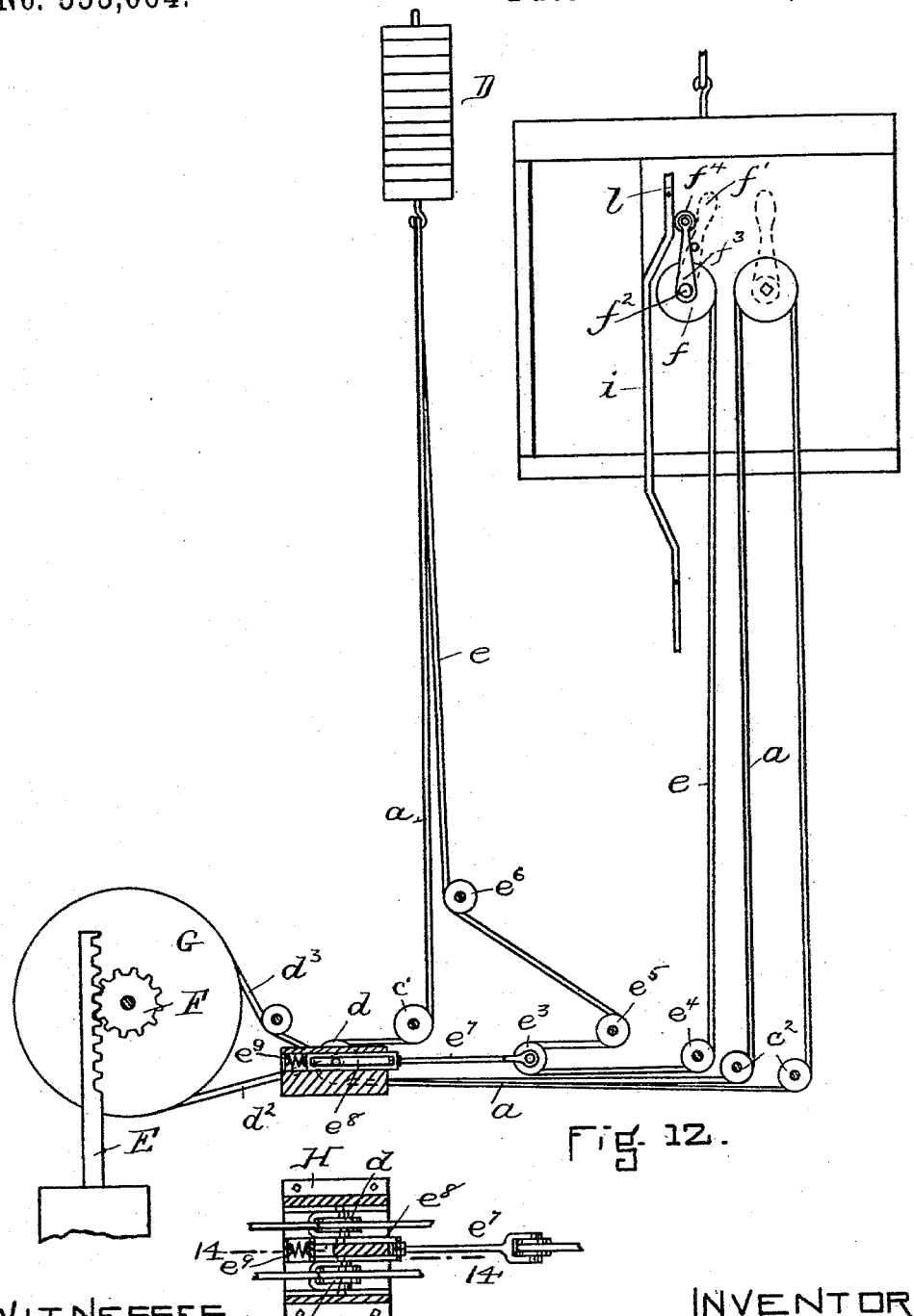
Figure 15:
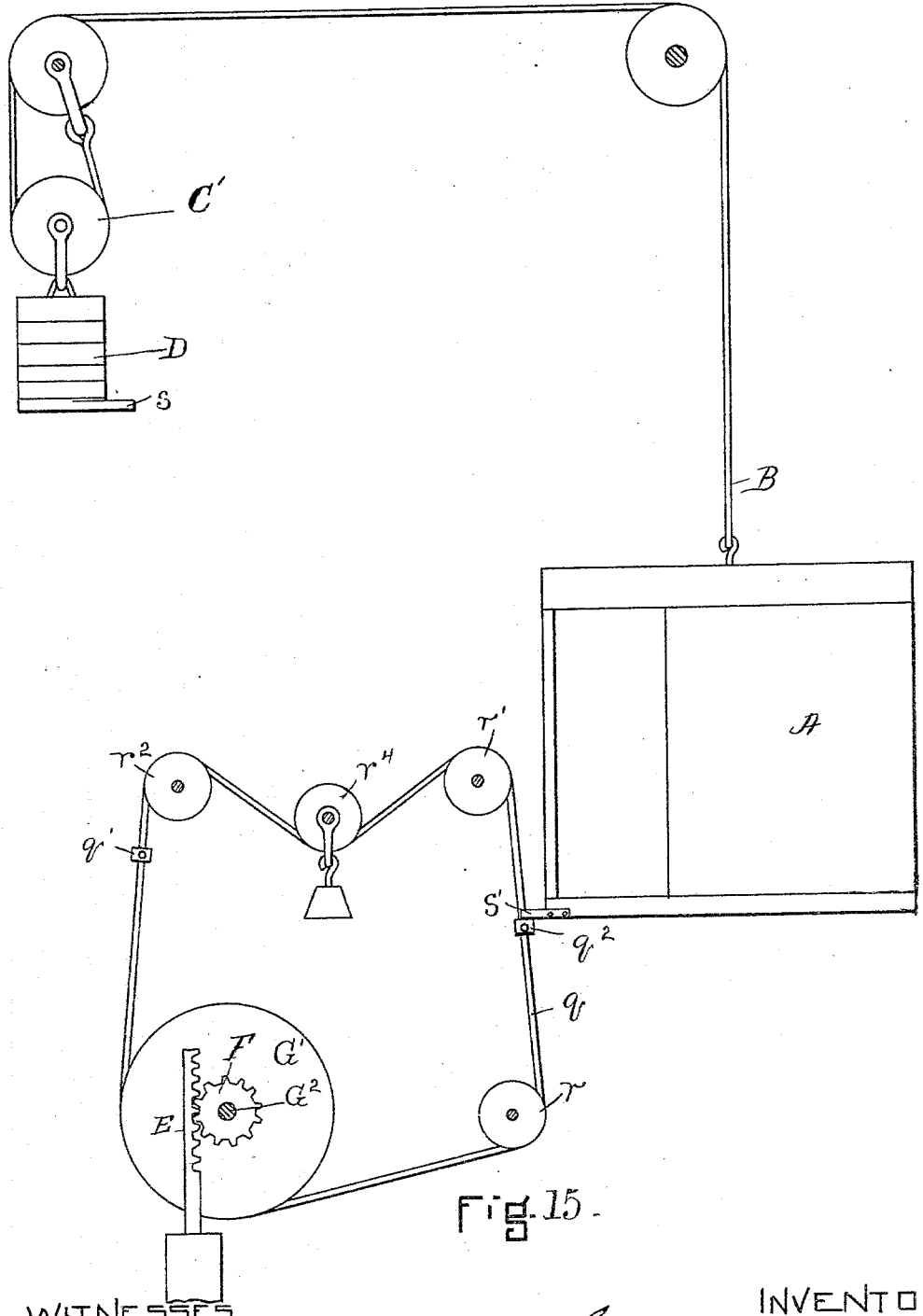
Figure 18:
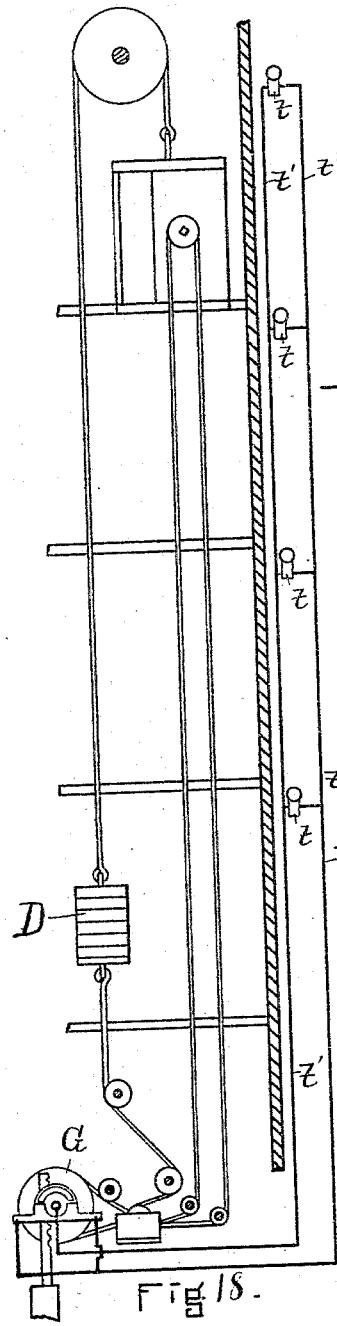

Figure 1 is a side view of an elevator-cage, showing one way of arranging the operating-rope and connecting it with the counterweight. Fig. 2 is a plan view showing the operating-rope and the drum for shifting the valve. Fig. 3 is a front elevation, partly in section, of the compensating devices for the operating-rope. Figs. 4 and 5 show the operating-rope as having its ends rigidly secured to the wall of the well. Figs. 6 and 7 show the operating-rope as secured to the counterweight and operating the valve-drum by supplemental ropes. Fig. 8 is a view showing in detail the supplemental rope for effecting the opening and closing of the valve when the cage is at predetermined points. Fig. 9 is a plan view of the rack and appurtenances. Fig. 10 is a perspective view of a part of the same. Fig. 11 shows a modification in respect to the supplemental means for effecting the stoppage of the cage. Figs. 12, 13, and 14 show a modified means for stopping the travel of the cage. Fig. 15 shows in detail an arrangement whereby the valve is automatically operated by the cage and by the counterweight, respectively, when the cage has reached its lowest and highest points of travel. Fig. 16 shows an arrangement of parts whereby all of the corridor or landing doors are simultaneously locked and unlocked against movement at predetermined times. Fig. 17 shows a slight modification in respect to the locking means that are employed in the construction shown in Fig. 16. Fig. 18 is a diagrammatic view showing the buzz for notifying persons of the moving of the cage. Figs. 19, 20, 21, and 22 show the means for closing the electric circuit whereby the buzz is sounded.

Referring to the drawings, the cage is uniformly designated by A, it being one of the ordinary types, suspended in the usual way upon the end of a flexible cable, chain, or other suspensory B, which latter passes over sheaves (see Fig. 15) and has its opposite end secured to a stationary point, there being a counterweight D hung from a sheave C' suspended from the cable B. The cage may rise and fall in suitable guides and its movement may be effected by a motor of any of the ordinary kinds now commonly used. I have conventionally illustrated at E a valve-rod which may be connected to a change or reversing valve controlling a steam or hydraulic cylinder and piston for operating mechanism by which the cage is raised and lowered. If desired, an electric motor controlled by said rod may be used. The rod E is provided with rack-teeth at one side with which mesh the teeth of a pinion F rigid with a drum G on a shaft $G^2$.

The rod, the pinion, and the drum, which are shown as one form of stop and start mechanism for the motor, may be varied to suit the particular form of motor that it may be desired to employ.

Heretofore the valve has been operated in some cases by an endless rope, traveling with the cage and connected directly with the counterweight, and passing around operating-sheaves at the bottom of the well. This is an excellent arrangement, as it takes all longitudinal strain off the operating-rope, and yet it is not applicable to the many elevator apparatuses in which the counterweight is so arranged, by doubling the suspensory, as to run but half the travel of the car. Hence, by my improvements, the operating-rope is passed around a pulley on the counterweight, and has its ends secured to the well or hatchway wall, so that although the suspensory be doubled, yet the shortened travel of the counterweight is compensated for.

The operating or valve-controlling rope is indicated by $a$, and passes around a hand-controlled wheel $b$ on the cage. This wheel may be operated in any convenient way and may be provided with devices for holding it stationary at any point in its revolution. The rope $a$ has its ends secured to the well-walls, as in Figs. 4 and 5, or to a weight sliding in guides on the well-wall, as illustrated in Figs. 1 and 3, from whence they pass over small sheaves $c\ c$ depending from the counterweight D, thence downward around stationarily-mounted sheaves $c'\ c'$, under sheaves $c^2\ c^2$ and around the wheel $b$. When the cage is moving upward, the counterpoise will move downward a distance half that traversed by the cage, so that the rope is free to move with the cage under the sheaves $c'\ c^2$.

One half of the rope $a$ passes around a pulley $d$ and the other around a pulley $d'$, the said pulleys $d'\ d$ being each secured to the end of the valve-operating means which, in this case, are ropes secured to the drum $g$. The pulleys $d\ d'$ are mounted on shafts $d^5$ which slide transversely of their axes in grooves $d^6$ in a guide-frame H, which is secured to the floor in any suitable way. This guide-frame H will be hereinafter further described in connection with Figs. 13 and 14.

One rope $d^2$ passes in one direction around the drum and the other $d^3$ around the drum in the other direction, so that if one rope is subjected to a longitudinal pull the drum will be rotated in one direction, and if the other rope is pulled the drum will be rotated in the other direction, so that the valve will be either opened or closed, as the case may be. Thus, if the hand-controlled wheel $b$ be rotated in the direction of the arrow, the left-hand side of the rope $a$ will be taken up (the right-hand side being paid out in accordance therewith) so that the pulley $d'$ is drawn forward and the pulley $d$ is drawn backward, thereby causing the drum G to be rotated in the direction of the arrow and the rod E to be moved upward. The rope $a$ moves freely past the pulleys when the cage is in motion, yet the latter are sensitive to the slightest movement of the hand-controlled wheel $b$.

In order to compensate for any longitudinal movement of the ends of the rope $a$, I may attach them to a cross-bar $a'$ which lies between four upright spring-pressed bars $a^2$. A weight $a^3$ is attached to the cross-bars $a'$ so as to keep the rope $a$ taut. The spring-pressed bars are mounted in a frame $a^4$, which latter is secured to one of the walls of the well.

It is apparent that, if desired, as heretofore stated, the rope $a$ may have its ends secured by eyebolts $a^5$ to the walls of the well, as illustrated in Figs. 4 and 5.

Referring to Figs. 6 and 7, it will be seen how the rope $a$ may be materially shortened. The ropes $d^2$ and $d^3$, or chains if desired, which are secured to the drum, (not shown,) are of considerable length and pass around pulleys $d^4$ in the bottom of the well. The rope $a$ passes down around the pulleys $d\ d'$, thence upward over pulleys $d^5$, under pulleys $d^6$, up over pulleys $c\ c$ on the counterweight D and having its ends finally secured to the eyebolts $a^5$. In all of these figures the line $a$ is what is termed a "running rope"—that is, a rope which travels with the car, in contradistinction to a "standing line," or a line relatively to which the car travels.

It is well known to those practically acquainted with elevators that it is frequently impossible to stop the elevator at the proper point, and that when the cage is traveling at a high rate of speed the machinery is subjected to sudden and severe strains when it is desired to stop its ascent or descent by means of the operating-rope, and the passengers subjected to a disagreeable shock when the cage is brought to a sudden rest. Hence I employ a flexible means supplemental to the hand-operating devices for automatically stopping the car at predetermined points. I have shown several mechanisms for accomplishing this purpose, they being illustrated in Figs. 8 to 14.

Referring first more particularly to Figs. 8 to 10, $e$ is a single rope having one end secured to a wheel $f$ on the cage, which latter is rotated by means of a lever $f'$, as shown in dotted lines. The other end of the rope $e$ is secured to the counterweight D so that as one end rises the other end falls, and vice versa, the rope passing around pulleys $e'\ e^2$ secured to the well-walls near the bottom thereof. The rope $a$ has one-half passed around a drum $g$ which is mounted on a shaft $g'$ journaled in any suitable bearings in the cellar or in the bottom of the well. A pinion $g^2$ is keyed or otherwise secured to shaft $g'$ and meshes with a rack-bar $h$ which slides in suitable guides. (Not shown.)

It will be seen that if rope $a$ is drawn in one direction the rack-bar will be moved by the drum and pinion in the other direction, and vice versa. The rack-bar is secured to parallel side bars $h'$ provided with cross-pieces $h^2$ corresponding to the number of landings at the side of the elevator-well.

$i$ is a dog pivoted on a cross-shaft $i'$ and lying above the path of the cross-bars $h^2 h^2$. The dog is provided with an extension $i^2$ on which is journaled a loose pulley $i^3$, and which is also provided with a weight $i^4$, the purpose of which weight is to overcome the tendency in the sudden starting of the car to throw the dog into engagement with the cross-bar $h^2$. The rope $e$ passes from the pulley $i^3$ and up over the pulley $e'$, so that if the lever $f'$ be moved to the right the rope will be wound on the wheel $f$, thereby lifting pulley $i^3$ and throwing the dog $i$ down, so that it will engage with the next cross-piece $h^2$ as the side bars move past. This stops the movement of the rack-bar and prevents the pinion $g^2$ and drum $g$ from rotating, but as the cage and counterweight still continue to move, one valve-controlling pulley $d$ will be drawn forward and the other drawn back, so that the drum G is rotated in one direction or the other and the valve shifted. The pinion, rack, and cross-bars are so related to the travel of the cage that the cross-bars correspond to the landings and stop the elevator at the proper place. The cross-bars are made adjustable, each being provided with slots $h^3$ through which bolts $h^4$ pass into cross-bars $h^5 h^5$, (see Fig. 10,) and into the parallel side bars $h' h'$. The cross-bars $h^5 h^5$ can be moved apart and secured in place at any points relatively to each other and to the iron bar $h^2$ by the bolts $h^4$. A counterbalancing-spring $f^2$ is employed to make it comparatively easy for the operator to manipulate the lever $f'$ to throw the dog $i$ into the path of the cross-bar $h^2$.

Referring to Fig. 11, a different mechanism is shown for accomplishing the automatic stopping of the elevator-cage. The rope $a$ passes between stationarily-mounted devices for engaging it, consisting of a stationary bar $j$ suitably mounted in the wall of the elevator-shaft and a clamp $j'$. The latter is secured to a lever $k$ pivoted at $k'$ and provided with a counterbalancing-weight $k^2$ and a pulley $k^3$. The supplemental running rope $e$ is secured to a wheel $f$ and to the counterweight, as in Fig. 8, and causes the stationarily-mounted device $j'$ to engage the rope $a$, and thereby shift the stop and start mechanism. Rigid with the wheel $f$ is a lever $f^3$ and an antifriction-wheel $f^4$, which latter rests against a guide-rail $l$ extending from the top to the bottom of the elevator-well. At each floor it is bent outward, as at $l'$, so that when the cage reaches that point the lever $f^3$ is pressed outward by the lever $f'$, the rail permitting it, thereby lengthening the rope $e$ and allowing pulley $k^3$ to drop, whereby the weight $k^2$ causes the clamp $j'$ to grip the rope $a$ against the cross-bar $j$. This draws one pulley $d$ forward and allows the other to move backward, the same as in Fig. 8, thereby shifting the valve.

For the sake of clearness and convenience I have shown a device for clamping but one part of the rope to stop the car in its movement in one direction, but it will be understood that in actual practice I employ two clamping devices, one for each side of the rope, so as to stop the car in either of its movements. In Figs. 12, 13 and 14 I show a slightly-modified device for stopping the car. In this case the rope $a$ passes around the pulleys $c^2$, $d$ and $c'$, being secured to the counterweight D at its ends. The rope $e$ is secured to the wheel $f$, which is rigidly mounted on a shaft $f^2$ projecting through the side of the cage, there being a lever $f'$ secured to the shaft on the inner end thereof for rotating the said shaft and wheel whereby the rope $e$ is drawn in or paid out. The latter passes from the wheel $f$ down under pulley $e^4$, around the pulley $e^3$, back around pulley $e^5$, under pulley $e^6$ up to the counterweight D. The pulley $e^3$ is connected through the medium of a link $e^7$ to one end of a sliding frame $e^8$, there being a helical spring $e^9$ to keep the frame drawn back. (See Figs. 12 and 13.) This construction serves, among other things, as a rope-tightener to the rope $e$—that is, as a means for keeping the rope $e$ taut.

In Fig. 14 I have shown a way in which the spring $e^9$ may be interposed between a head $e^{14}$ on the end of the link $e^7$ and the frame $e^8$ and operate with the same effect as before explained.

The frame $e^8$ has grooves or slots $e^{10}$ in its sides corresponding to the grooves in the side flanges of the guide-frame H, so that the axles of the pulleys $d\ d'$ can slide freely back and forth therein as the rope $a$ is drawn in and paid out for shifting the valve-rod or stop-and-start mechanism. When the valve is open, one pulley is in a forward position and the other is some distance behind it, so that when it is desired to close the valve, it is merely necessary to draw the frame forward, and the end walls of the slots $e^{10}$ will cause both pulleys to come to a state of rest in the position shown in Fig. 13, as will readily be understood. The spring $e^9$ also serves to normally hold the frame $e^8$ in the position shown in Fig. 13, so that the pulleys $d\ d'$ are free to slide back and forth for opening the valve.

The frame $e^8$ constitutes a device for operating the stop-and-start mechanism, and is, as said, provided with a loose pulley $e^3$, around which the supplemental running line $e$ passes to operate it. In all of these devices it will be observed that I have provided an operative running line connected with the car and coacting with stationarily-mounted devices for operating the stop-and-start mechanism. By "stationarily mounted" I mean that the devices are not connected with the car so as to travel therewith, but are mounted on supports which are stationary; and also that I have provided means for automatically operating the stationarily-mounted devices when the cage has reached a predetermined point in its travels. In Figs. 11 and 12 the means consists of the offset guide-rail and the lever $f^3$, and in Fig. 8 it consists of the traveling rack and the dog $i$. By the said means the cage may be automatically stopped at any landing by the operative drawing upon the lever $f'$, as will be clearly understood; and in Figs. 11 and 12 the supplemental rope is locked against movement relatively to the car, except when the lever $f^3$ is opposite one of the offsets in the cam track or rail.

I also employ means for locking all the corridor-doors during the movement of the cage, as is illustrated in detail in Figs. 16 and 17. In this instance the means is operated mediately by the operating-rope $a$ through the medium of the drum G and its supporting-shaft, and is so constructed and arranged that when the valve is partially or entirely open locking devices are so shifted that they lie in the path of each door and prevent the movement.

Referring to Fig. 16, it will be seen that a rope or chain $n$ is employed, supplemental to ropes $a$ and $e$, (not shown,) which passes around a sheave $o$ at the top of the well or hatchway, a sheave $o'$ at the bottom of the well, and a guide-sheave $o^2$, having the axis substantially in the horizontal plane of the axis of the sheave $o$. Then the rope has its ends secured to a sheave $o^3$, which is keyed or otherwise rigidly secured to the shaft, to which drum G is also rigidly secured.

$n'$ $n^2$ are cable attachments or clips clamped to the rope $n$, respectively, slightly above and below the upper and lower sills of the corridor-door and lying in the vertical planes of the door. Each attachment or clip is provided with a projection $n^3$, which moves down into the path of the door-sill when the cable is shifted vertically, so that if the cable moves downward clip $n'$ drops into the path of the door, and if the cable is drawn upward clip $n^2$ rises with it so as to engage the vertical side bar of the door. Thus the doors are effectually locked against movement when the valve is shifted and the car is in motion.

It sometimes happens that the engineer or mechanic must get into the well or get on top of the cage to repair some parts, and this latter cannot be done unless the top of the cage is below the landing, at which time the door is locked. Hence it is necessary that one or more of the clips be provided with a projection that can be slipped out from behind the door, so as to allow it to be opened.

In Fig. 17 I have shown a lower clip $n^4$ as being provided with a laterally-extending offset $n^5$, the clip being rigidly clamped on the cable or rope $n$. Above the stationary clip $n^4$ is a vertically-sliding clip $n^6$, having a projection $n^3$ for engaging the door, and an offset $n^8$ similar to that at $n^5$. The clip $n^6$ is held in position by a spring $n^{10}$, there being a bolt $n^9$, which limits the vertical movement of said clip.

When the cable is moved upward in the operation of shifting of the valve, pin $n^3$ engages the edge of the door; but it can be moved down out of engagement therewith to open the door when that becomes necessary, the spring forcing it back in place after the door is again shut.

Above the door are two stationarily-secured clips $n''$ $n''$, with a freely-sliding bolt or pin, which is held down by force of gravity, so that no spring is needed. When this pin is in engagement with the door by reason of the shifting of the rope $n$ it can be slid up out of engagement with the door by hand.

In order to reduce the travel of the supplemental line the sheave $o^3$ is of a reduced diameter, so that when the drum is rotated the line will move a distance less than the distance the main rope travels. The parts are so arranged that the supplemental line will move just enough to carry the pins $n^3$ behind the doors.

In order to prevent too great vertical movement of the cage and prevent any accident which might happen if the operating-ropes $a$ and $e$ should become broken or disabled, I employ means supplemental thereto for bringing the cage to a state of rest at its highest and lowest points of travel respectively. In Fig. 15 such means are illustrated. A rope or chain $q$ is attached to a drum G' supplemental to drum G (not shown in said figure) and rigid with its supporting-shaft $G^2$. It passes around guide-sheaves $r$ $r'$ $r^2$ and is kept taut by a weighted pulley $r^4$. The vertical portions of the rope $q$ are each provided with an attachment or clip $q'$ $q^2$, with which can alternately engage a projection $s'$ on the cage. When the cage is traveling downward and has nearly reached its lowest point, projection $s'$ will strike clip $q^2$ and shift the valve-rod in one direction, so as to stop the cage, and a similar thing will happen when projection $s$ on the counterweight D strikes clip $q$ during the upward movement of the cage.

In addition to the above-described safety devices whereby the corridor-doors are automatically locked I employ other safety devices, consisting of means for audibly notifying waiting passengers of the movement of the car. This may be done by an electric sounding device located on the cage or at the top of the hatchway or well. I prefer in many cases to place a sounding device on each floor, and in Fig. 18 I have shown the device as so placed. The device may consist of a "buzz" or of a bell having a sound different from that of the signal or call bell on the cage. In order that the sounding device may be sounded while the car is in motion, I provide a switch, moved by the operating-rope, for closing the electric circuit in which the sounding device is located.

Figure 19:
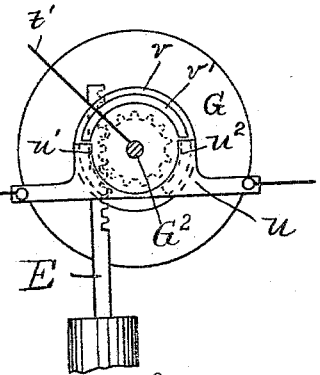
Figure 20:
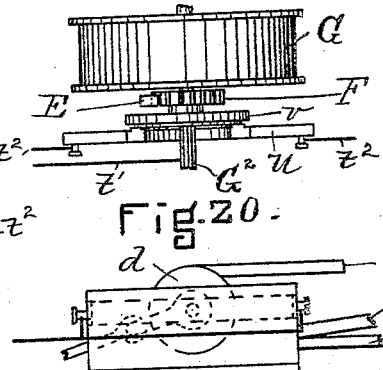

In Fig. 18 I have illustrated somewhat conventionally an electric circuit and a series of sounding devices, together with the switch which is operated by the valve-closing devices. Referring to Figs. 19 and 20, $t\ t\ t$ are a series of sounding devices connected in multiple arc in a circuit consisting of wires $t'\ t^2$. One wire, $t'$, is electrically connected with the shaft which supports the valve-operating drum G, and the other wire, $t^2$, is connected with a metallic plate $u$ having two arc-like contact-surfaces $u'\ u^2$. On the shaft $G^2$ and electrically connected therewith is a metallic disk $v$ having a concentric arc-like contact-surface $v'$. The contact-surfaces $u'$, $u^2$ and $v'$ are so related that when the valve is closed they will occupy the position shown in Figs. 19 and 20 and the circuit will be open; but if the drum G is moved in the slightest degree to open the valve the contact $v'$ will engage either contact $u'$ or $u^2$ and the circuit will be closed, thereby causing the buzzes or signals $t$ to sound, which they will continue to do until the valve is closed.

Figure 21:
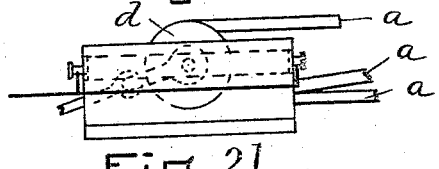
Figure 22:
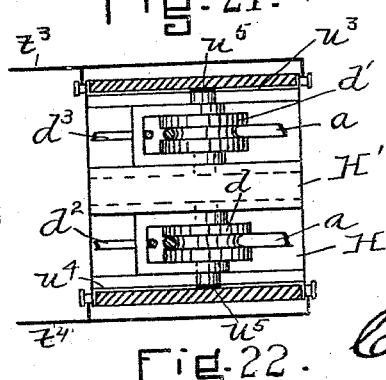

In Figs. 21 and 22 I have shown a modification in which the circuit is closed by the shafts of the pulleys $d\ d'$. In this case wire $t^3$ is connected to a metallic strip $u^3$, and wire $t^4$ is connected to a similar strip $u^4$. At $u^5$ in each metallic strip is a strip of insulating material. The shafts of wheels $d\ d'$ are metallic, and rest against the said strips $u^3\ u^4$, except when the valve is closed, when they will rest against the insulating-strip $u^5$. The inner ends of the axles rest in grooves in a metallic flange H', so that they shall be always in electrical connection.

When the valve is opened by the rope $a$ moving the pulleys $d\ d'$ the axles of the latter will close the circuit through wire $t^3$, strip $u^3$, flange H', strip $u^4$, and wire $t^4$, thereby causing the signal to sound.

While I have herein described my invention and parts thereof as embodied in one or several forms, yet it will be understood that I do not limit myself to the devices shown, as many changes may be made without departing from the spirit and scope of my invention.

Whenever I herein use the term "valve-shifting devices" it will be understood that I mean devices for starting and stopping the motor of any kind or type.

I do not herein claim broadly a car-controlling device comprising a controlling-line, a hand device for shifting said line, secondary mechanism for shifting said line to stop the motor, and means to prevent the operation of said secondary mechanism, except when the car is near a landing, as that forms the subject-matter of a claim in my co-pending application, Serial No. 533,652, filed January 2, 1895.

What I claim is—

1. In an elevator apparatus, a cage, a suspensory therefor, a counter-weight, a stop and start mechanism, an operating line connected with the stop and start mechanism, devices on the well wall for compensating for the variations in the length of the line, said line traveling with the car, passing around a pulley on the counter-weight, and having its ends secured to said compensating devices on the wall of the well or hatchway.

2. In an elevator, the combination with the cage, a running operative line traveling therewith, a stop and start mechanism for the motor, and two movable pulleys connected with the stop and start mechanism, and around which the operative line passes, of a supplemental line traveling with the car, for drawing said pulleys to a neutral position to effect a stopping of the car.

3. In an elevator, the combination with the cage, of a stop and start mechanism, a running operative rope, a stationarily mounted device for shifting the operative rope whereby the stop and start mechanism is operated, and said device having a loose pulley, and a supplemental running rope operated from the cage and passing around said loose pulley to operate said device.

4. In an elevator, the combination with the cage, of a stop and start mechanism, a running operative rope connected therewith, stationarily mounted devices adapted to engage said rope, and a supplemental line for operating said stationarily mounted devices to engage the rope and shift the stop and start mechanism.

5. In an elevator, the combination with the cage, of a stop and start mechanism for the motor, a running rope connected with the said mechanism and adapted to be moved by an operative in the cage, a running line supplemental to the rope for shifting the stop and start mechanism independently thereof, and means for automatically operating the said supplemental line when the car has reached a predetermined point in the travel, substantially as set forth.

6. In an elevator, the combination with the cage, the suspensory, and the counterweight, of the stop and start mechanism for the motor, a rope for operating the said mechanism, and a rope supplemental to that aforesaid and connected to and traveling with the cage and the counterweight, and also connected to the stop and start mechanism for operating the same, substantially as set forth.

7. In an elevator, the combination with the cage, of a stop and start mechanism for the motor, a running rope for operating said mechanism to start the motor, a running rope supplemental to said rope for operating said mechanism to stop the motor, and means for locking the said supplemental running rope against movement relatively to the car except at predetermined points, substantially as set forth.

8. In an elevator, the combination with the cage and a track extending up the elevator well and having offset or cut-away portions corresponding to the landings, of a stop and start mechanism for the motor, a rope for operating said mechanism to stop the motor and devices on the cage for operating said rope, said devices having means engaging the said track whereby they can be operated only when the said means are opposite one of the offset or cut-away portions of the said track, substantially as set forth.

9. In an elevator, the combination with the cage, a cam-track having offset or cut-away portions, a stop and start mechanism for the motor, and a rope for operating said mechanism of a supplemental rope for operating said mechanism to stop the motor, a wheel for said supplemental rope on the cage, and devices rigidly connected with said wheel and engaging the cam track, whereby said wheel cannot be rotated except when said devices reach said offset portions substantially as described.

10. In an elevator, the combination with the cage, a cam track having offset portions corresponding to the landings, and a stop and start mechanism for the motor, of a rope for operating said mechanism to stop the motor and a wheel on the cage for said rope, and a lever engaging said cam track, whereby it can be moved only when opposite the offset portions, substantially as set forth.

11. In an elevator, the combination with the cage and the stop and start mechanism for the motor, of the means on the cage for operating said mechanism to start the motor with different degrees of speed, and means on the cage for stopping said car at an exact predetermined point irrespective of the speed of the cage, substantially as set forth.

12. In an elevator, a series of movable corridor doors, a cage, an operating line, a supplemental line, attachments carried by said supplemental line for simultaneously locking said corridor doors, and means interposed between the two lines whereby the supplemental line moves a distance less than the travel of the operating line.

13. In an elevator, a cage, a counterweight, and a suspensory, in combination with a stop and start mechanism, a rope, connected therewith and having clips or attachments, and means carried by the counterweight and cage, respectively for engaging said clips or attachments on said rope, substantially as set forth.

14. In an elevator, a cage, stop and start mechanism for the motor, two movable pulleys connected with said stop and start mechanism, a running rope passing around said pulleys for moving them to operate the stop and start mechanism, and means supplemental to said running rope for moving said pulleys to a neutral position whereby the said mechanism is brought to a non-active position, and the movement of the car is stopped.

15. The combination with the cage, the operating rope and the stop and start mechanism, of a sounding device, an electric circuit including said sounding device and a contact movable by said operating rope for closing said circuit for causing the sounding device to operate during the movement of the cage, substantially as set forth.

16. The combination with the traveling cage, of an electric circuit, an electric sounding device in said circuit and means for closing said circuit during the travel of the cage, whereby the sounding device is continuously actuated while the cage is in motion.

In testimony whereof I have signed my name to this specification, in the presence of two subscribing witnesses, this 5th day of February, A. D. 1895.

CHARLES A. HARKNESS.

Witnesses:
ARTHUR W. CROSSLEY,
C. C. STECHER.